United States Patent
Benameur et al.

(10) Patent No.: US 10,243,963 B1
(45) Date of Patent: Mar. 26, 2019

(54) SYSTEMS AND METHODS FOR GENERATING DEVICE-SPECIFIC SECURITY POLICIES FOR APPLICATIONS

(71) Applicant: Symantec Corporation, Mountain View, CA (US)

(72) Inventors: Azzedine Benameur, Fairfax, VA (US); Nathan Evans, Sterling, VA (US); Yun Shen, Bristol (GB)

(73) Assignee: Symantec Corporation, Mountain View, CA (US)

( * ) Notice: Subject to any disclaimer, the term of this patent is extended or adjusted under 35 U.S.C. 154(b) by 184 days.

(21) Appl. No.: 14/973,768

(22) Filed: Dec. 18, 2015

(51) Int. Cl.
*G06F 21/55* (2013.01)
*H04L 29/06* (2006.01)
*G06F 21/51* (2013.01)

(52) U.S. Cl.
CPC ........ *H04L 63/105* (2013.01); *H04L 63/1408* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 8,799,980 B2* | 8/2014 | Shafer | ................... | G06Q 10/06 705/56 |
| 8,910,263 B1* | 12/2014 | Martini | ................. | H04L 63/102 726/26 |
| 8,966,632 B1* | 2/2015 | Huang | ................... | G06F 21/53 713/183 |
| 9,172,773 B2* | 10/2015 | Burns | .................... | G06F 9/541 |
| 2003/0220986 A1* | 11/2003 | Thakor | ................. | H04L 41/082 709/220 |
| 2010/0162036 A1* | 6/2010 | Linden | .................. | G06F 11/181 714/4.11 |
| 2010/0318686 A1* | 12/2010 | Ver Steeg | ............... | H04L 12/66 710/8 |
| 2011/0067105 A1* | 3/2011 | Wolfe | ................... | G06F 11/302 726/23 |

(Continued)

OTHER PUBLICATIONS

CN102346828A.English Translation. Feb. 2012.*

(Continued)

*Primary Examiner* — Venkat Perungavoor
(74) *Attorney, Agent, or Firm* — FisherBroyles, LLP

(57) ABSTRACT

The disclosed computer-implemented method for generating device-specific security policies for applications may include (1) installing, onto a computing device, an application requested by the computing device, (2) while the application is running on the computing device, monitoring interactions between the application and a computing environment in which the computing device operates to identify (A) computing resources within the computing environment required by the application and (B) potential security concerns related to the application within the computing environment, and then (3) generating, based on the monitored interactions, a set of device-specific security policies to enforce for the application while the application runs on the computing device that allow the application to access the required computing resources while mitigating the potential security concerns. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2012/0017213 | A1* | 1/2012 | Hunt | G06F 21/53 718/100 |
| 2012/0054829 | A1* | 3/2012 | Holostov | G06F 21/53 726/3 |
| 2012/0284702 | A1* | 11/2012 | Ganapathy | G06F 9/468 717/174 |
| 2012/0304283 | A1* | 11/2012 | Beam | G06F 9/468 726/17 |
| 2013/0036431 | A1* | 2/2013 | Douceur | G06F 21/53 719/327 |
| 2013/0318157 | A1* | 11/2013 | Harrison | H04L 67/42 709/203 |
| 2014/0165134 | A1* | 6/2014 | Goldschlag | G06F 21/60 726/1 |
| 2014/0181974 | A1* | 6/2014 | Yablokov | G06F 21/566 726/23 |
| 2014/0331279 | A1* | 11/2014 | Aissi | G06F 21/53 726/1 |
| 2015/0040239 | A1* | 2/2015 | Buerk | G06F 21/88 726/26 |
| 2015/0326435 | A1* | 11/2015 | Tamura | H04L 41/0803 709/221 |
| 2016/0292420 | A1* | 10/2016 | Langton | G06F 21/566 |

OTHER PUBLICATIONS

Sunil Pandita, et al.; Systems and Methods for Enabling Users to Launch Applications Without Entering Authentication Credentials; U.S. Appl. No. 14/968,935, filed Dec. 15, 2015.

"Docker", https://www.docker.com/, as accessed Nov. 23, 2015, (Dec. 21, 1996).

"Runtime metrics—Docker stats", https://docs.docker.com/v1.9/engine/articles/runmetrics/, as accessed Nov. 23, 2015, (on or before Nov. 23, 2015).

"AppArmor", http://wiki.apparmor.net/index.php/Main_Page, as accessed Nov. 23, 2015, (Mar. 23, 2011).

Kleyman, Bill, "Understanding Application Containers and OS-Level Virtualization", http://vvww.datacenterknowledge.com/archives/2015/01/05/understanding-application-containers-and-os-level-virtualization/, as accessed Nov. 23, 2015, (Jan. 5, 2015).

"Twistlock", https://www.twistlock.com/, as accessed Nov. 23, 2015, (Dec. 8, 2003).

* cited by examiner

# US 10,243,963 B1

SYSTEMS AND METHODS FOR GENERATING DEVICE-SPECIFIC SECURITY POLICIES FOR APPLICATIONS

BACKGROUND

Organizations and individuals often implement security policies to control the behavior and/or protect the safety of applications running on their computing devices. In some examples, security policies may restrict the activities or permissions of an application by implementing whitelists that define acceptable behaviors for the application and/or blacklists that define unacceptable behaviors for the application.

Unfortunately, traditional security systems may be unable to efficiently generate policies for an application that are effective in various computing environments in which the application may be deployed. For example, a conventional security system may create a general security policy that does not take into account the type of computing device executing an application, other applications installed on the computing device, and/or properties of network connections accessible to the computing device. Such policies may be ineffective against security threats that are unique to certain devices.

Moreover, in the event that a traditional security system is capable of creating more customized policies for individual devices or groups of devices, the system may require that an administrator or other user manually enter whitelists or blacklists to implement on each device. This process may be time-consuming, tedious, and/or ineffective, as an administrator may be unable to comprehensively analyze all of the computing resources and security threats within a particular computing environment. As such, the current disclosure identifies and addresses a need for improved systems and methods for generating device-specific security policies for applications.

SUMMARY

As will be described in greater detail below, the instant disclosure describes various systems and methods for generating device-specific security policies for applications by monitoring the behavior of an application while the application is running on a computing device. The systems and methods described herein may then generate device-specific security policies that allow the application to access necessary computing resources (e.g., files, network ports, etc.) on the computing device while preventing the application from accessing any unnecessary and/or potentially harmful computing resources.

In one example, a computer-implemented method for performing such a task may include (1) installing, onto a computing device, an application requested by the computing device, (2) while the application is running on the computing device, monitoring interactions between the application and a computing environment in which the computing device operates to identify (A) computing resources within the computing environment required by the application and (B) potential security concerns related to the application within the computing environment, and then (3) generating, based on the monitored interactions, a set of device-specific security policies to enforce for the application while the application runs on the computing device that allow the application to access the required computing resources while mitigating the potential security concerns.

In some examples, installing the application onto the computing device may include installing the application in an application container that separates the application from other applications on the computing device. In these examples, monitoring the interactions between the application and the computing environment may include monitoring communications sent to and from the application container. In these examples, a backend security server may ship the application in the application container to the computing device in response to a request from the computing device to receive the application.

In some embodiments, the potential security concerns may include a potentially malicious computing resource within the computing environment. Additionally or alternatively, the potential security concerns may include a computing resource within the computing environment that the application does not need to access during operation of the application.

In some examples, the computing environment may include at least one network accessible to the computing device. In these examples, monitoring the interactions between the application and the computing environment may include identifying network ports within the network used by the application, identifying additional applications connected to the network, and/or identifying characteristics of the network. The characteristics of the network may include a type of the network, a security level of the network, and/or a provider of the network. In addition, in these examples, generating the set of device-specific security policies may include generating policies that restrict the access of the application and the additional applications to the network ports used by the application based on the characteristics of the network and/or characteristics of the additional applications.

In some embodiments, the computing environment may include at least one file system within the computing device. In such embodiments, monitoring the interactions between the application and the computing environment may include intercepting attempts by the application to access files within the file system. In addition, in such embodiments, generating the set of device-specific security policies may include generating policies that define permissions granted to the application within the file system and/or files accessible to the application within the file system.

In one embodiment, a system for implementing the above-described method may include (1) an installation module that installs, onto a computing device, an application requested by the computing device, (2) a monitoring module that monitors, while the application is running on the computing device, interactions between the application and a computing environment in which the computing device operates to identify (A) computing resources within the computing environment required by the application and (B) potential security concerns related to the application within the computing environment, and (3) a generation module that generates, based on the monitored interactions, a set of device-specific security policies to enforce for the application while the application runs on the computing device that allow the application to access the required computing resources while mitigating the potential security concerns. In addition, the system may include at least one hardware processor configured to execute the installation module, the monitoring module, and the generation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) install, onto a computing device, an application requested by the computing device, (2) while the application is running on the computing device, monitor interactions between the application and a computing environment in which the computing device operates to identify (A) computing resources within the computing environment required by the application and (B) potential security concerns related to the application within the computing environment, and then (3) generate, based on the monitored interactions, a set of device-specific security policies to enforce for the application while the application runs on the computing device that allow the application to access the required computing resources while mitigating the potential security concerns.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
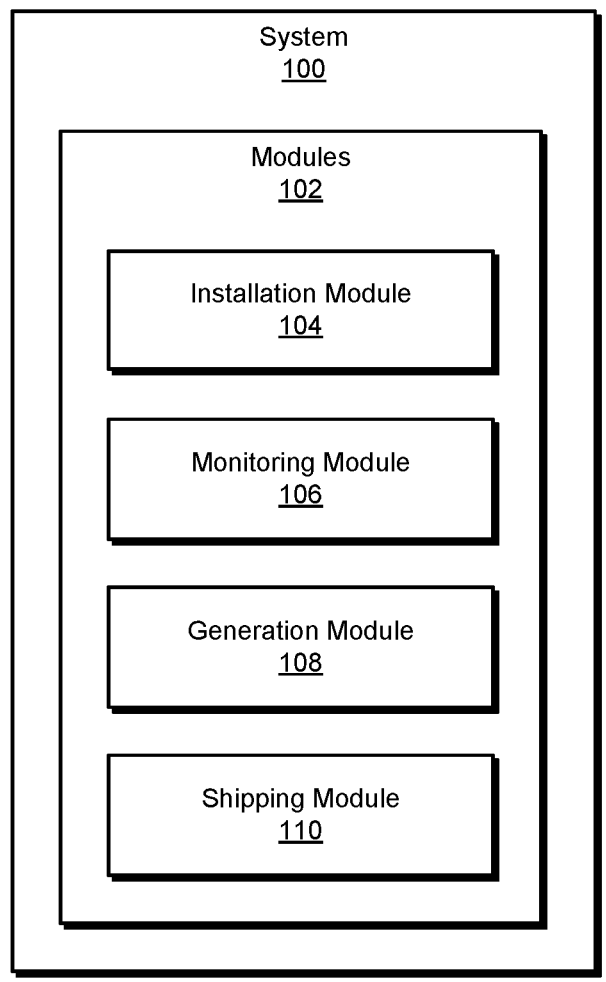
FIG. 1 is a block diagram of an exemplary system for generating device-specific security policies for applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating device-specific security policies for applications. As will be explained in greater detail below, by monitoring interactions between an application and a computing environment (e.g., a computing device and/or network) in which the application is running, the systems and methods described herein may determine which computing resources within the computing environment are necessary to the operation of the application and which computing resources are potentially harmful to the application. As such, the disclosed systems and methods may efficiently generate comprehensive device-specific security policies that take into account the unique configuration and security threats present on individual computing devices.

Figure 2:
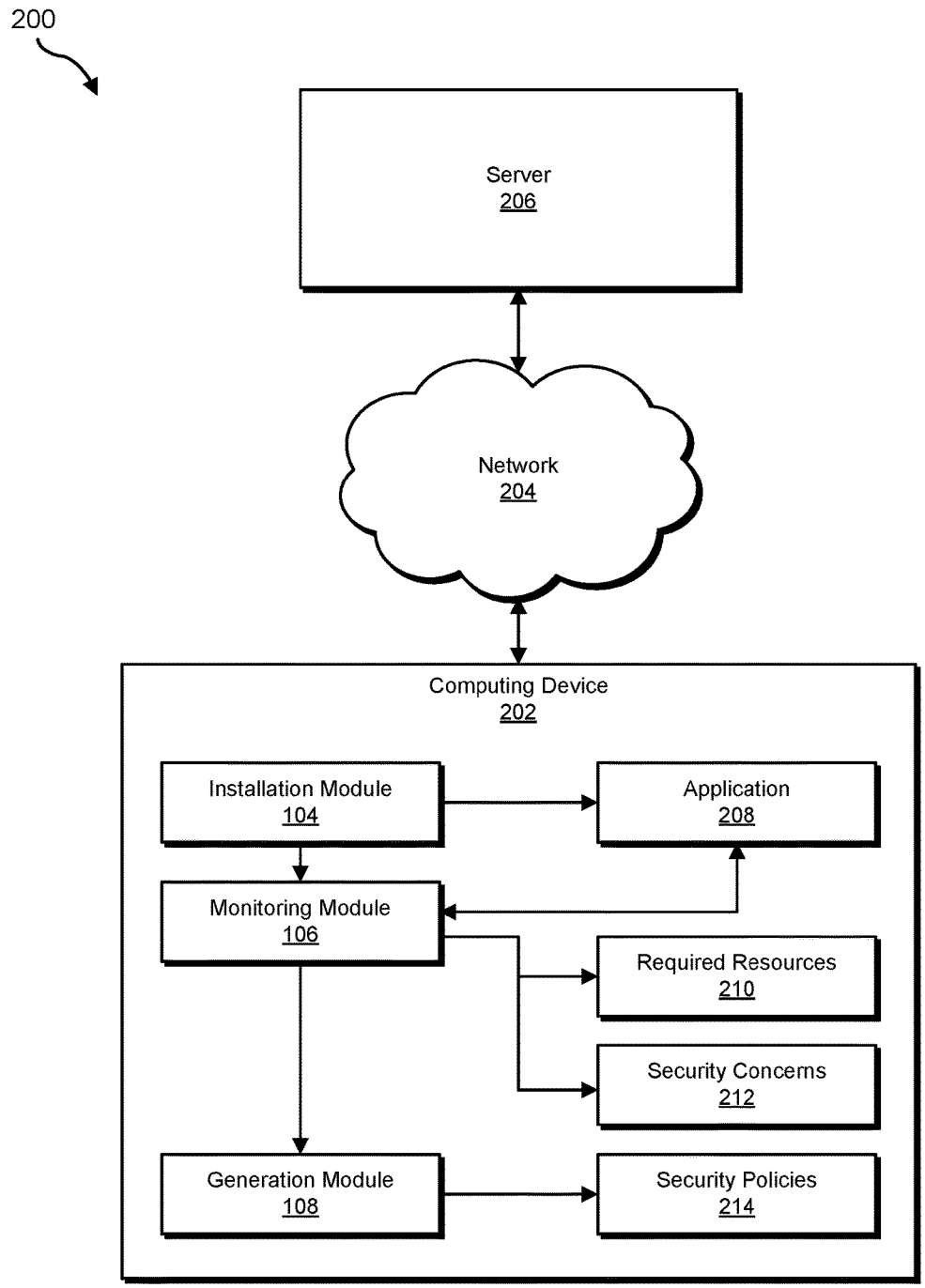
FIG. 2 is a block diagram of an additional exemplary system for generating device-specific security policies for applications.
Figure 3:
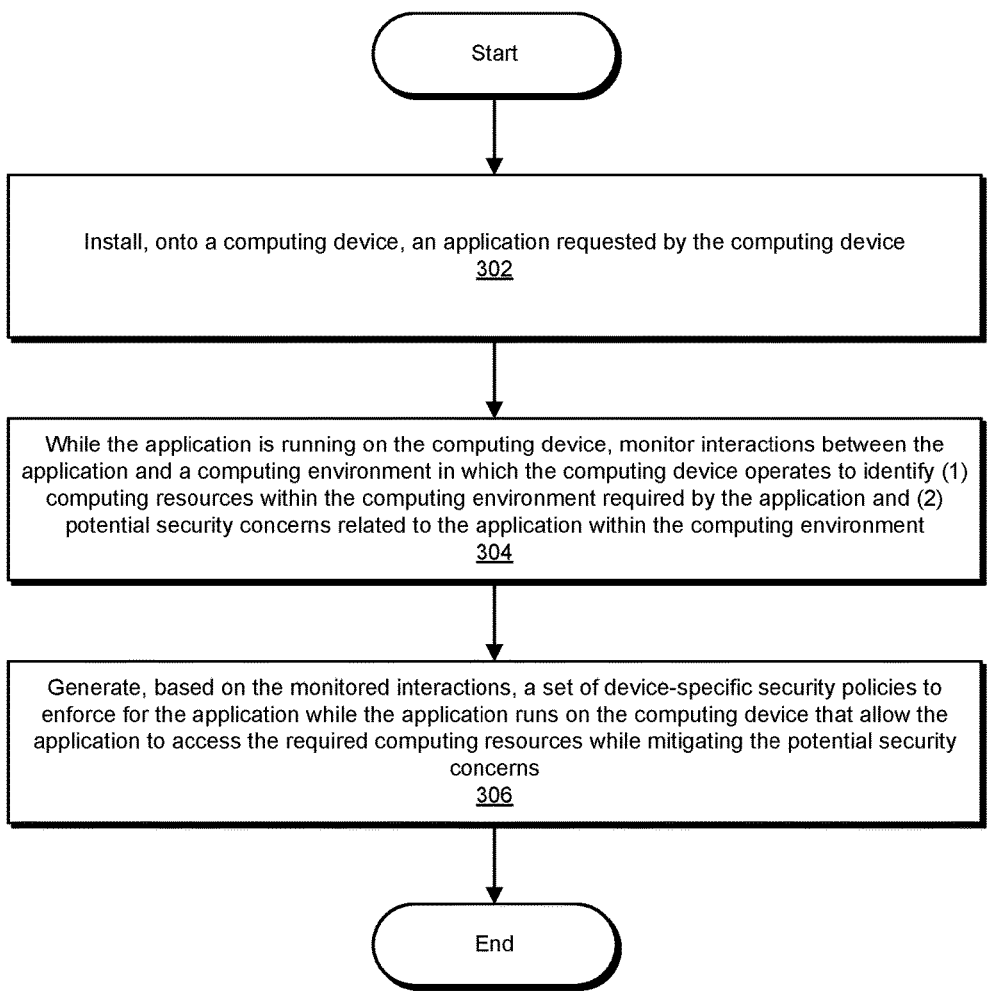
FIG. 3 is a flow diagram of an exemplary method for generating device-specific security policies for applications.
Figure 4:
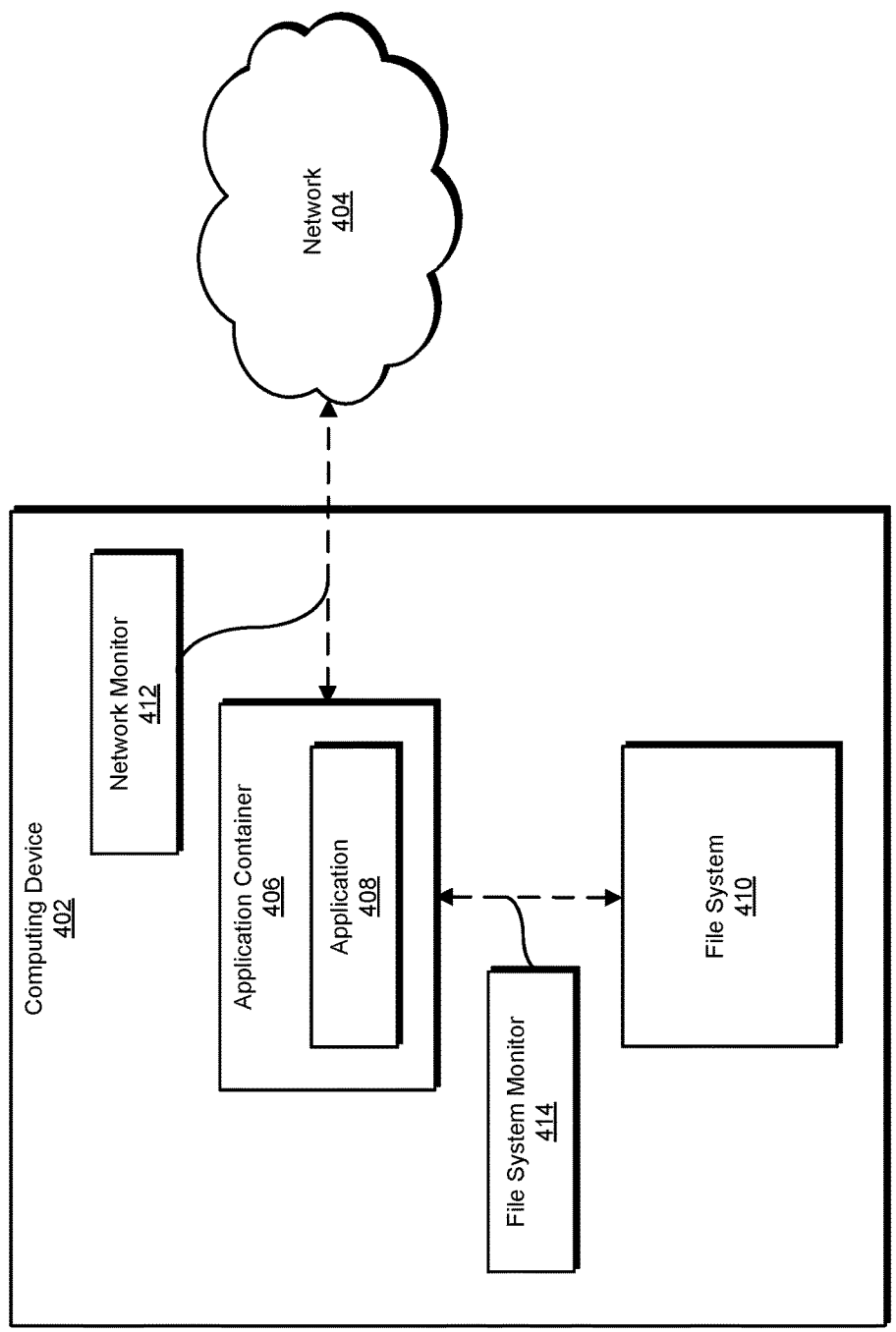
FIG. 4 is a block diagram of an additional exemplary system for generating device-specific security policies for applications.

The following will provide, with reference to FIGS. 1, 2, and 4, detailed descriptions of exemplary systems for generating device-specific security policies for applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for generating device-specific security policies for applications. As illustrated in this figure, exemplary system 100 may include one or more modules 102 for performing one or more tasks. For example, and as will be explained in greater detail below, exemplary system 100 may include an installation module 104 that installs, onto a computing device, an application requested by the computing device. Exemplary system 100 may also include a monitoring module 106 that monitors, while the application is running on the computing device, interactions between the application and a computing environment in which the computing device operates to identify (1) computing resources within the computing environment required by the application and (2) potential security concerns related to the application within the computing environment.

In addition, and as will be described in greater detail below, exemplary system 100 may include a generation module 108 that generates, based on the monitored interactions, a set of device-specific security policies to enforce for the application while the application runs on the computing device that allow the application to access the required computing resources while mitigating the potential security concerns. Finally, exemplary system 100 may include a shipping module 110 that ships the application within an application container to the computing device from a back-end security server. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In the example of FIG. 2, computing device 202 may be programmed with one or more of modules 102. In this example, modules 102 may monitor applications running on computing device 202 to generate security policies for the applications. Additionally or alternatively, server 206 may be programmed with one or more of modules 102. In these examples, server 206 may provide applications to computing device 202 (e.g., within application containers that facilitate monitoring the applications).

In one embodiment, one or more of modules 102 from FIG. 1 may, when executed by at least one processor of computing device 202, enable computing device 202 to generate device-specific security policies for applications. For example, and as will be described in greater detail below, installation module 104 may cause computing device 202 to install, onto computing device 202, an application 208 after computing device 202 requests to receive application 208. While application 208 is running on computing device 202, monitoring module 106 may cause computing device 202 to monitor interactions between application 208 and a computing environment in which computing device 202 operates to identify (1) required resources 210 within the computing environment that are required by application 208 and (2) security concerns 212 within the computing environment that are related to application 208. Finally, generation module 108 may cause computing device 202 to generate, based on the monitored interactions, a set of security policies 214 to enforce for application 208 while application 208 runs on computing device 202.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of hosting applications, distributing applications to computing devices, and/or generating security policies for applications. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for generating device-specific security policies for applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may install, onto a computing device, an application requested by the computing device. For example, installation module 104 may, as part of computing device 202 in FIG. 2, install application 208 onto computing device 202.

The term "application," as used herein, generally refers to any type or form of collection of files, software, or executable code configured to provide one or more services or complete one or more tasks. Examples of applications include, without limitation, media applications, messaging applications, gaming applications, security applications, work-related applications, cloud-based applications, applications downloaded onto personal computing devices, variations of one or more of the same, combinations of one or more of the same, and/or any additional type of application.

The systems described herein may install an application onto a computing device in a variety of ways. In some examples, installation module 104 may install an application onto a computing device after the computing device requests to receive the application. For example, a user of the computing device may request to download the application from a server that hosts the application. In some embodiments, the server may represent a backend security server that hosts one or more of modules 102, such as shipping module 110. In response to a request from a computing device to receive an application, shipping module 110 may distribute the application to the computing device.

A computing device may receive an application in any additional manner, such as by downloading an attachment to an electronic message that contains the application and/or uploading the application from a portable storage device. After a computing device receives an application, installation module 104 may facilitate the computing device installing the application onto the operating system of the computing device.

In some embodiments, installation module 104 may install an application within an application container. The term "application container," as used herein, generally refers to any type or form of software-based partition or division that separates one or more applications from other applications on a computing device. For example, when activated, an application container may enable an application within the container to interact normally with an operating system of the device that hosts the container. When the application container is deactivated, the contents of the application container may be hidden from or appear invisible to the operating system. In addition, an application container may include all of the files necessary to run an application (e.g., libraries, directories, runtime tools, etc.) and therefore enable a computing device to quickly and seamlessly execute the application. As will be explained in greater detail below, installing applications within application containers may enable the systems described herein to more accurately and/or efficiently detect and analyze the behavior of the applications.

In some examples, shipping module 110 may ship an application to a computing device by deploying the application within an application container. In these examples, installation module 104 may simply activate the application container on the computing device. In other examples, installation module 104 may receive an application that is not within a container and place the application in a container before allowing the application to run on a computing device.

Returning to FIG. 3, at step 304 one or more of the systems described herein may, while the application is running on the computing device, monitor interactions between the application and a computing environment in which the computing device operates to identify (1) computing resources within the computing environment required by the application and (2) potential security concerns related to the application within the computing environment. For example, monitoring module 106 may, as part of computing device 202 in FIG. 2 while application 208 runs on computing device 202, monitor application 208 to identify required resources 210 and security concerns 212.

The term "computing resource," as used herein, generally refers to any type or form of component, element, or part of a computing device or network infrastructure used by or accessible to an application. Examples of computing resources include, without limitation, files, programs, networks, network ports, computing devices, user accounts, computing permissions, hardware components within a computing device, portions of executable code, and/or any additional computing resource. In addition, the term "required computing resource" as used herein, generally refers to any type or form of computing resource that is necessary and/or helpful for an application to perform one or more tasks.

In addition, the term "computing environment," as used herein, generally encompasses any and/or all of the computing resources accessible to a computing device, application, or other computing resource. For example, a computing environment in which a particular computing device operates may include all of the files, data, and programs within the computing device, as well as any networks available to the computing device (and any computing resources accessible via the networks, such as other applications and/or devices connected to the networks).

Furthermore, the term "security concern," as used herein, generally refers to any type or form of computing resource or combination of computing resources that may compromise the performance and/or safety of an application or the computing device running the application. For example, a security concern may represent any computing resource that an application may use to inadvertently or intentionally perform malicious behaviors. Additionally, a security concern may represent any resource that may compromise or harm an application. As an example, a malicious file (e.g., a file known to include malware or that was provided by an illegitimate source) may represent a security concern. As another example, a network port used to communicate with potentially illegitimate applications and/or unsecure network connections may represent a security concern. Furthermore, in some examples, any computing resource not strictly necessary to the operation of an application may represent a security concern. For example, the systems described herein may streamline the performance of an application and/or prevent any potential (even if unlikely) security threats by classifying any computing resource that is not relevant to the functionality of an application as a security concern.

The systems described herein may monitor interactions between an application and a computing environment in which the application operates in a variety of ways. In some examples, monitoring module 106 may direct an application to execute or perform any task or series of tasks that the application will likely perform while operating normally on a computing device. While the application is completing the tasks, monitoring module 106 may monitor and record any attempt by the application to communicate with and/or access a computing resource. At any point before, while, or after the application accesses a computing resource, monitoring module 106 may identify the computing resource and determine whether the computing resource is required by the application, whether the computing resource is helpful to the application (but not required), or whether the computing resource is a potential security concern.

Once an application begins running on a computing device, monitoring module 106 may begin to identify and classify computing resources accessed by the application. In some examples, monitoring module 106 may continue to record accessed computing resources for a predetermined amount of time (e.g., half an hour). In other examples, monitoring module 106 may record each computing resource accessed while the application is completing a set of standard tasks. Additionally or alternatively, monitoring module 106 may continue to record accessed computing resources until the application no longer accesses new resources (e.g., until the application has not accessed a new resource within a predetermined amount of time). Once monitoring module 106 has collected information sufficient to identify computing resources required by the application and potential security threats posed to the application, monitoring module 106 may cease monitoring the behavior of the application.

Monitoring module 106 may detect attempts by an application to access a variety of types of computing resources. In some examples, monitoring module 106 may detect attempts by an application to access computing resources that are internal to the computing device running the application. Specifically, monitoring module 106 may record particular files or data stored within the computing device that the application accesses. Additionally or alternatively, monitoring module 106 may record attempts by the application to use certain permissions (e.g., rights to access certain files or run certain scripts). In some embodiments, monitoring module 106 may detect such attempts to access internal computing resources by identifying and analyzing alerts or notifications that indicate the behavior of an application. For example, monitoring module 106 may prompt a computing device running an application to generate such notifications. These notifications may describe any type or form of event performed by an application and include any of a variety of information about the events, such as which permissions are required to perform the event and/or file names or file paths involved in the event.

In addition to or instead of monitoring attempts by an application to access internal computing resources, monitoring module 106 may monitor the access of an application to external computing resources (e.g., resources used to access a network or resources accessible via a network). For example, monitoring module 106 may identify each network port or address that an application uses (e.g., binds to or accesses). In addition, monitoring module 106 may identify each cloud-based application, Internet Protocol (IP) address, or Media Access Control (MAC) address with which an application communicates.

As mentioned above, in some examples, the systems described herein may distribute an application to a computing device in an application container and then install the application within the container onto the computing device. In these examples, monitoring module 106 may monitor interactions between the application and the computing device by monitoring communications sent to and from the application container. For example, monitoring module 106 may intercept (e.g., hook) events associated with the application container. By monitoring the activity surrounding an application container, monitoring module 106 may filter out the activity of other applications on a computing device and more accurately and efficiently detect the computing resources accessed by an application within the container.

However, monitoring module 106 may monitor the activities of an application in any additional or alternative manner, such as by hooking communications sent directly to and from the application and/or searching event logs for events associated with the application.

As part of monitoring interactions between an application and a computing environment, monitoring module 106 may identify and record characteristics of the application. For example, monitoring module 106 may determine whether an application is configured to operate on client devices or servers. As another example, monitoring module 106 may determine the functionality of an application (e.g., one or more tasks the application is configured to perform). Monitoring module 106 may also identify characteristics of entities associated with the application, such as a user responsible for initiating the installation of the application, a creator of the application, and/or a publisher of the application.

Additionally or alternatively, monitoring module 106 may determine characteristics or properties of the computing environment in which an application is running. For example, monitoring module 106 may determine whether any files accessed by the application are classified as "sensitive" or "restricted." In other examples, monitoring module 106 may determine the type of a network accessed by an application. For example, monitoring module 106 may determine whether a network is a wired or wireless connection, whether the network is public or private, or whether the network has limited access or global access. Furthermore, monitoring module 106 may determine a security level of a network, such as whether the network requires a password for access or whether the network encrypts communications sent via the network. In addition, monitoring module 106 may identify a provider of a network, such as an Internet Service Provider (ISP) responsible for the network or an organization that manages the network. Monitoring module 106 may identify such characteristics of a computing environment in any suitable manner, such as by analyzing information within communications sent to and from an application, additional queries or requests sent to computing resources within the computing environment, and/or via a user or administrator manually providing the information.

In some embodiments, monitoring module 106 may determine whether a computing resource represents a security threat based at least in part on characteristics of the computing resource and/or an application accessing the computing resource. For example, monitoring module 106 may generate a set of rules or heuristics that compares properties of a computing resource with properties of an application attempting to access the resource. Examples of factors incorporated into such rules or heuristics may include whether an application is a client-side or server-side application, whether a network accessed by the application is global or limited, or whether a cloud-based service accessed by the application is trusted.

As an example, monitoring module 106 may determine that an application installed on a computing device is a web browser application that automatically binds to or uses specific ports within a network. In addition, monitoring module 106 may determine that the network the application is accessing is a public network. Monitoring module 106 may then determine that because the network is a public network, the web browser application does not need to and/or should not communicate with all types of applications that have access to the ports the application uses. As such, monitoring module 106 may identify particular network ports that the application does need to access and/or specific applications connected to the public network that should have access to the ports used by the web browser application.

FIG. 4 illustrates an exemplary configuration of the systems described herein. In this example, a computing device 402 may access a network 404 and a file system 410 within computing device 402. As shown in FIG. 4, computing device 402 may also include an application container 406 that contains an application 408. In addition, computing device 402 may include a network monitor 412 and a file system monitor 414. These monitors may represent specialized portions of monitoring module 106. In the example of FIG. 4, network monitor 412 may monitor interactions between application container 406 and network 404. Specifically, network monitor 412 may monitor the inbound and outbound network ports that application 408 uses to communicate via network 404. In addition, file system monitor 414 may monitor interactions between application container 406 and file system 410. Specifically, file system monitor 414 may analyze notifications that describe attempts by application 408 to access files within file system 410. In some examples, the information gathered by network monitor 412 and file system monitor 414 may be used to generate security policies for computing device 402 that control the behavior of application 408 with respect to network 404 and file system 410.

Returning to FIG. 3, at step 306 one or more of the systems described herein may generate, based on the monitored interactions, a set of device-specific security policies to enforce for the application while the application runs on the computing device that allow the application to access the required computing resources while mitigating the potential security concerns. For example, generation module 108 may, as part of computing device 202 in FIG. 2, generate security policies 214 to enforce for application 208 while application 208 runs on computing device 202.

The term "security policy," as used herein, generally refers to any type or form of rule, restriction, or constraint applied to the behavior of an application or computing device in order to protect the application and/or computing device. The term "device-specific security policy," as used herein, generally refers to any security policy that is tailored to a particular computing device. For example, a device-specific security policy for an application may only be applied to the application while the application is running on the device for which the security policy was generated. Accordingly, other computing devices may generate and enforce different device-specific policies for the application.

The systems described herein may generate device-specific security policies for applications in a variety of ways. In some embodiments, generation module 108 may create security policies that prevent an application from accessing any computing resources that are not required for the application to operate. For example, generation module 108 may generate a whitelist (e.g., a list of computing resources an application is allowed to access) that includes each file, permission, network port, or other computing resource that monitoring module 106 determined was required for the application. In some examples, the whitelist may not include any additional computing resources potentially accessible by the application. As such, generation module 108 may ensure that the application has access to every computing resource that is relevant to and/or aids the operation of an application while preventing the application from accessing any unnecessary resources or potentially malicious resources. In other words, generation module 108 may generate the most restrictive set of policies that still enable an application to function properly.

In other embodiments, generation module 108 may create security policies that prevent an application from accessing only computing resources that have been determined to be detrimental to the operation of an application. For example, generation module 108 may create a blacklist (e.g., a list of computing resources that an application is blocked from accessing) that contains any malicious computing resource identified within the application's computing environment. Alternatively, generation module 108 may create policies that restrict malicious resources from accessing the application. As an example, generation module 108 may create policies that prevent devices connected to an unsecured or public network from accessing network ports used by an application.

Furthermore, in some examples, generation module 108 may update or customize a pre-defined set of security policies associated with an application. For example, an administrator or security service may have previously generated a set of security policies to be enforced for an application while the application runs on a variety of computing devices. While these policies may generally or usually protect the application and the computing devices that execute the application, they may not be effective in all circumstances due to particular files, networks, or other computing resources within the device's computing environments. As such, generation module 108 may tailor these existing policies to account for the specific security needs of individual computing devices.

After generating a set of device-specific security policies for an application, the systems described herein may enforce the policies on the device for which the policy was created. For example, in response to detecting an attempt by the application to access a computing resource, the systems described herein may identify the resource and compare the resource to the set of policies (e.g., a whitelist and/or blacklist). The systems described herein may then prevent or allow the application to access the computing resource based on the comparison.

As explained above in connection with FIG. 3, a computing device may install an application and then monitor interactions between the application and the computing device and/or a network accessible to the computing device. For example, the computing device may detect and record each computing resource accessed by the application. In addition, the computing device may identify properties or characteristics of the application and/or the computing resources the application accesses. Based on these observations, the computing device may determine which computing resources the application should be granted access to (e.g., which computing resources are necessary for the application to function properly) and which computing resources are unnecessary and/or potentially pose a security threat. The computing device may then generate security policies that are tailored to the specific required resources and security threats related to the operation of the application on the computing device.

Figure 5:
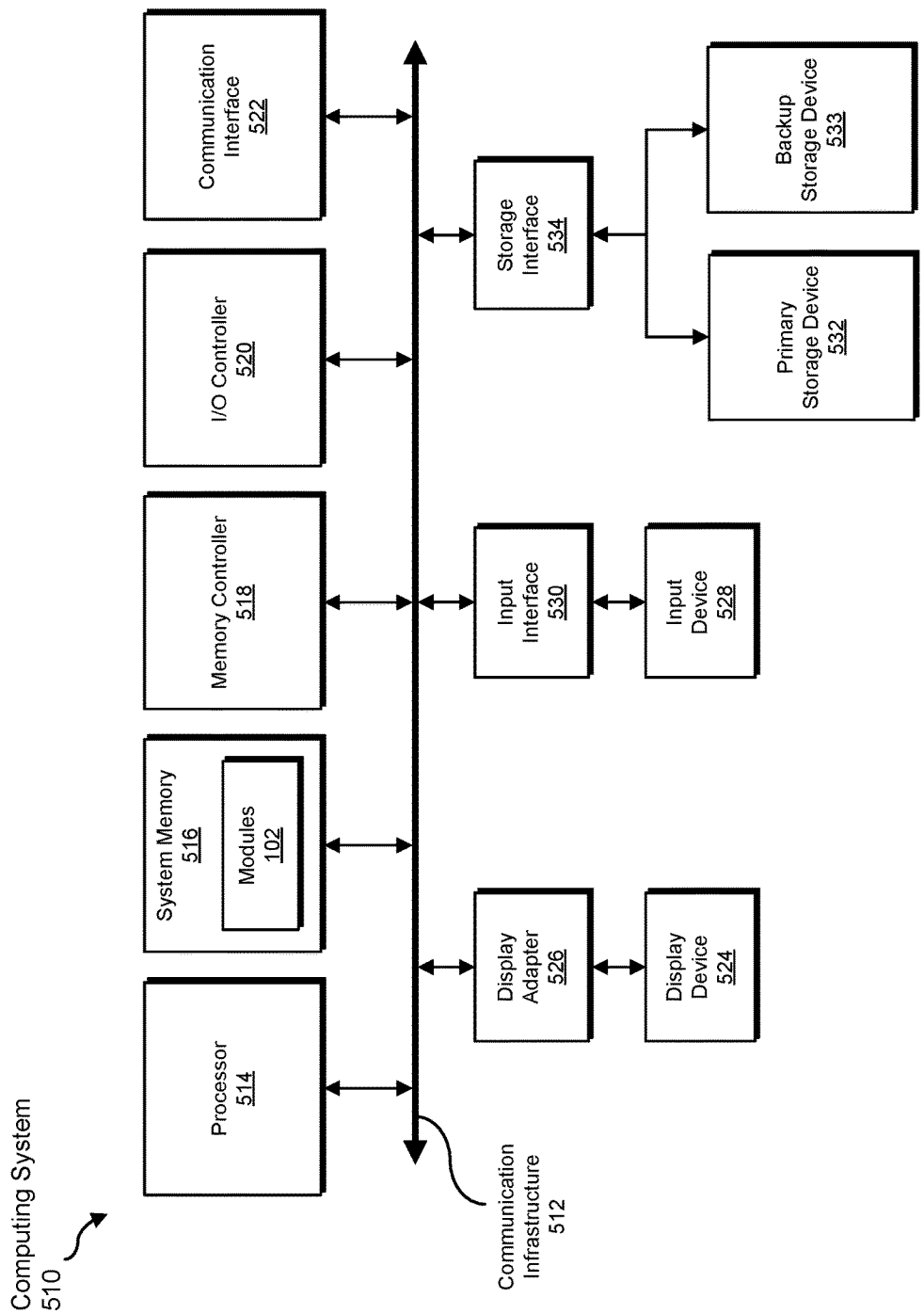
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
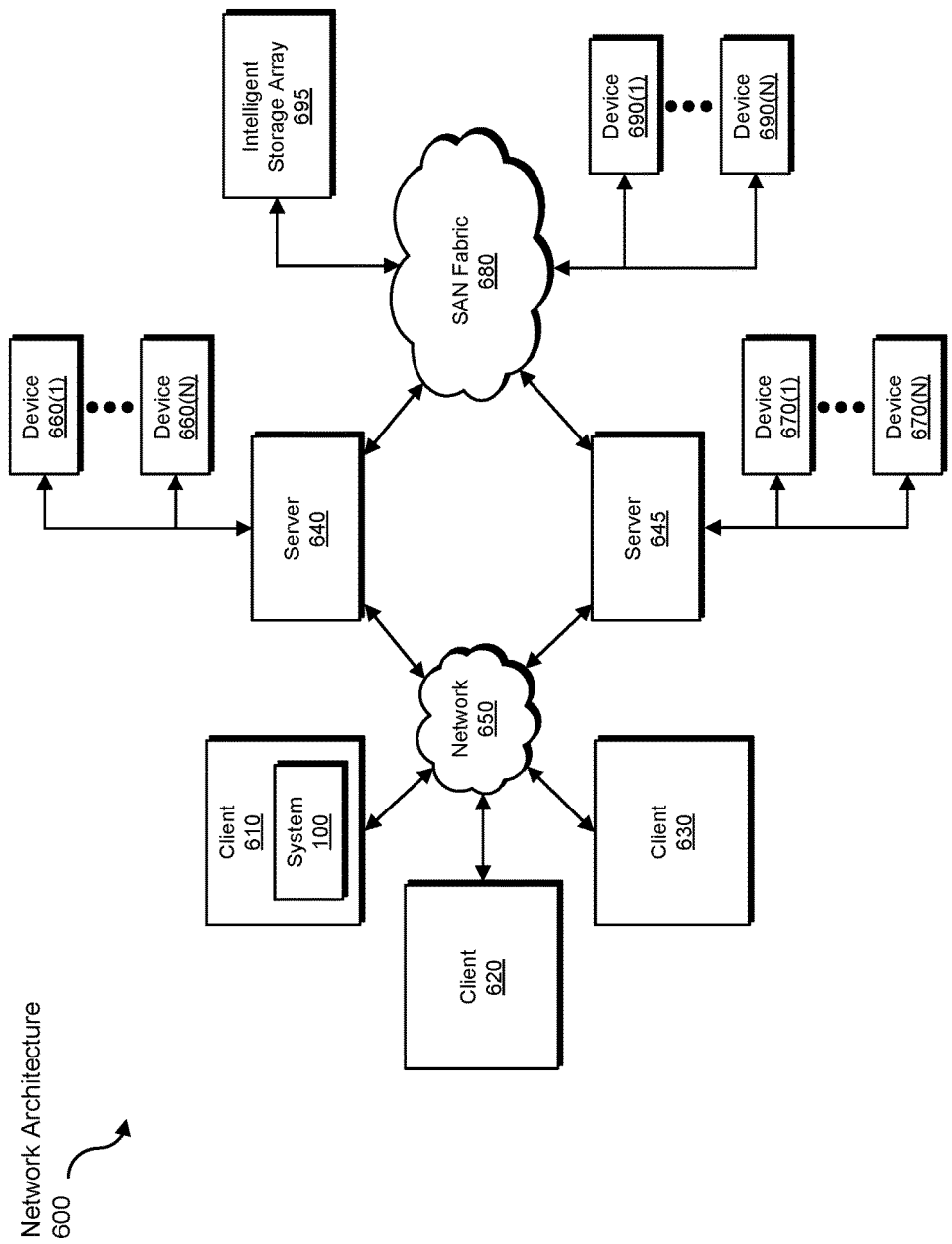
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for generating device-specific security policies for applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive interactions between an application and a computing environment, transform interactions into security policies that are tailored to the operation of the application within the computing environment, output a result of the transformation to a computing device within the computing environment, use the result of the transformation to safely operate the application within the computing environment, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating device-specific security policies for applications, at least a portion of the method being performed by a computing device comprising at least one processor, the method comprising:

directing, by the computing device, an application running on the computing device to perform a series of tasks;

while the application is performing the series of tasks, monitoring, by the computing device, interactions between the application and a computing environment in which the application operates to identify:

computing resources within the computing environment that are required by the application to operate properly within the computing environment;

computing resources within the computing environment that are not required by the application to operate properly within the computing environment; and potential security concerns related to the application within the computing environment;

generating, at least in part by the computing device, based on the monitored interactions, a set of device-specific security policies that enable the application to operate properly within the computing environment while mitigating the potential security concerns by:

allowing, by the computing device, the application to access the required computing resources while the application operates within the computing environment; and restricting, by the computing device, the application from accessing at least a portion of the computing resources that are not required by the application; and enforcing, by the computing device, the set of device-specific security policies within the computing environment while the application runs on the computing device.

2. The method of claim 1:

further comprising installing the application onto the computing device in an application container that separates the application from other applications on the computing device; and wherein monitoring the interactions between the application and the computing environment comprises monitoring communications sent to and from the application container.

3. The method of claim 2, further comprising a backend security server that ships the application in the application container to the computing device in response to a request from the computing device to receive the application.

4. The method of claim 1, wherein the potential security concerns related to the application comprise a potentially malicious computing resource within the computing environment.

5. The method of claim 1, wherein:

the computing environment comprises at least one network accessible to the computing device; and monitoring the interactions between the application and the computing environment comprises at least one of:
identifying network ports within the network used by the application;
identifying additional applications connected to the network; and
identifying characteristics of the network.

6. The method of claim 5, wherein generating the set of device-specific security policies comprises generating policies that restrict the access of the application and the additional applications to the network ports used by the application based on at least one of:
the characteristics of the network; and
characteristics of the additional applications.

7. The method of claim 5, wherein the characteristics of the network comprise at least one of:
a type of the network;
a security level of the network; and
a provider of the network.

8. The method of claim 1, wherein:

the computing environment comprises at least one file system within the computing device; and monitoring the interactions between the application and the computing environment comprises intercepting attempts by the application to access files within the file system.

9. The method of claim 8, wherein generating the set of device-specific security policies comprises generating policies that define at least one of:
permissions granted to the application within the file system; and
files accessible to the application within the file system.

10. A system for generating device-specific security policies for applications, the system comprising:

a monitoring module, stored in memory, that:
directs, on a computing device, an application running on the computing device to perform a series of tasks; and
monitors, on the computing device, while the application is performing the series of tasks, interactions between the application and a computing environment in which the application operates to identify:
computing resources within the computing environment that are required by the application to operate properly within the computing environment;
computing resources within the computing environment that are not required by the application to operate properly within the computing environment; and
potential security concerns related to the application within the computing environment;

a generation module, stored in memory, that:
generates, on the computing device, based on the monitored interactions, a set of device-specific security policies that enable the application to operate properly within the computing environment while mitigating the potential security concerns by:
allowing, on the computing device, the application to access the required computing resources while the application operates within the computing environment; and
restricting, on the computing device, the application from accessing at least a portion of the computing resources that are not required by the application; and
enforces, on the computing device, the set of device-specific security policies within the computing environment while the application runs on the computing device; and at least one hardware processor configured to execute the monitoring module and the generation module.

11. The system of claim 10:

further comprising an installation module that installs the application onto the computing device in an application container that separates the application from other applications on the computing device; and wherein the monitoring module monitors the interactions between the application and the computing environment by monitoring communications sent to and from the application container.

12. The system of claim 11, further comprising a shipping module, implemented on a backend security server, that ships the application in the application container to the computing device in response to a request from the computing device to receive the application.

13. The system of claim 10, wherein the potential security concerns related to the application comprise a potentially malicious computing resource within the computing environment.

14. The system of claim 10, wherein:

the computing environment comprises at least one network accessible to the computing device; and the monitoring module monitors the interactions between the application and the computing environment by at least one of:
  identifying network ports within the network used by the application;
  identifying additional applications connected to the network; and
  identifying characteristics of the network.

15. The system of claim 14, wherein the generation module generates the set of device-specific security policies by generating policies that restrict the access of the application and the additional applications to the network ports used by the application based on at least one of:
  the characteristics of the network; and
  characteristics of the additional applications.

16. The system of claim 14, wherein the characteristics of the network comprise at least one of:
  a type of the network;
  a security level of the network; and
  a provider of the network.

17. The system of claim 10, wherein:
  the computing environment comprises at least one file system within the computing device; and
  the monitoring module monitors the interactions between the application and the computing environment by intercepting attempts by the application to access files within the file system.

18. The system of claim 17, wherein the generation module generates the set of device-specific security policies by generating policies that define at least one of:
  permissions granted to the application within the file system; and
  files accessible to the application within the file system.

19. A non-transitory computer-readable medium comprising one or more computer-readable instructions that, when executed by at least one processor of a computing device, cause the computing device to:
  direct, by the computing device, an application running on the computing device to perform a series of tasks;
  while the application is performing the series of tasks, monitor, by the computing device, interactions between the application and a computing environment in which the application operates to identify:
    computing resources within the computing environment that are required by the application to operate properly within the computing environment;
    computing resources within the computing environment that are not required by the application to operate properly within the computing environment; and
    potential security concerns related to the application within the computing environment;
  generate, at least in part by the computing device, based on the monitored interactions, a set of device-specific security policies that enable the application to operate properly within the computing environment while mitigating the potential security concerns by:
    allowing, by the computing device, the application to access the required computing resources while the application operates within the computing environment; and
    restricting, by the computing device, the application from accessing at least a portion of the computing resources that are not required by the application; and
  enforce, by the computing device, the set of device-specific security policies within the computing environment while the application runs on the computing device.

20. The method of claim 1, wherein directing the application to perform the series of tasks comprises directing the application to perform at least one task the application is expected to perform during normal operation of the application.

* * * * *